United States Patent [19]

Löper

[11] Patent Number: 4,470,639
[45] Date of Patent: Sep. 11, 1984

[54] WHEEL COVER FOR A PASSENGER MOTOR VEHICLE

[75] Inventor: Bernd Löper, Korb, Fed. Rep. of Germany

[73] Assignee: Daimler-Benz Aktiengesellschaft, Stuttgart, Fed. Rep. of Germany

[21] Appl. No.: 471,041

[22] Filed: Mar. 1, 1983

Related U.S. Application Data

[63] Continuation of Ser. No. 200,384, Oct. 24, 1980, abandoned.

[30] Foreign Application Priority Data

Oct. 25, 1979 [DE] Fed. Rep. of Germany ....... 2943139

[51] Int. Cl.³ ............................................. B60B 7/00
[52] U.S. Cl. ............................ 301/37 PB; 301/37 P; 301/108 R
[58] Field of Search ............... 301/37 R, 37 P, 37 TP, 301/37 PB, 108 R, 108 A; 220/320; 292/256.6, 256.61, 256.65

[56] References Cited

U.S. PATENT DOCUMENTS

| | | | |
|---|---|---|---|
| 1,817,194 | 8/1931 | Hunt | 301/108 |
| 2,746,805 | 5/1956 | Gamundi | 301/37 R |
| 3,747,984 | 7/1973 | Andrews et al. | 301/37 P |
| 4,027,919 | 6/1977 | Foster et al. | 301/37 P |

*Primary Examiner*—H. Grant Skaggs
*Attorney, Agent, or Firm*—Craig & Burns

[57] ABSTRACT

A wheel cover, especially for wheels of a passenger motor vehicle, which includes a springy wire ring serving as a mounting element. The ring includes outwardly extending lug-shaped members distributed along its circumference. The lug-shaped members are adapted to engage in an annular recess of the wheel rim for holding the wheel cover to the wheel rim. A guide arrangement is provided on the wheel cover for guiding the lug-shaped members. The lug-shaped members are arranged in such a manner and extend radially outwardly to such an extent, that a connecting line of the points of force application between two adjacent lug-shaped members lies radially outside of the connecting sections of the wire ring extending between the lug-shaped members.

30 Claims, 6 Drawing Figures

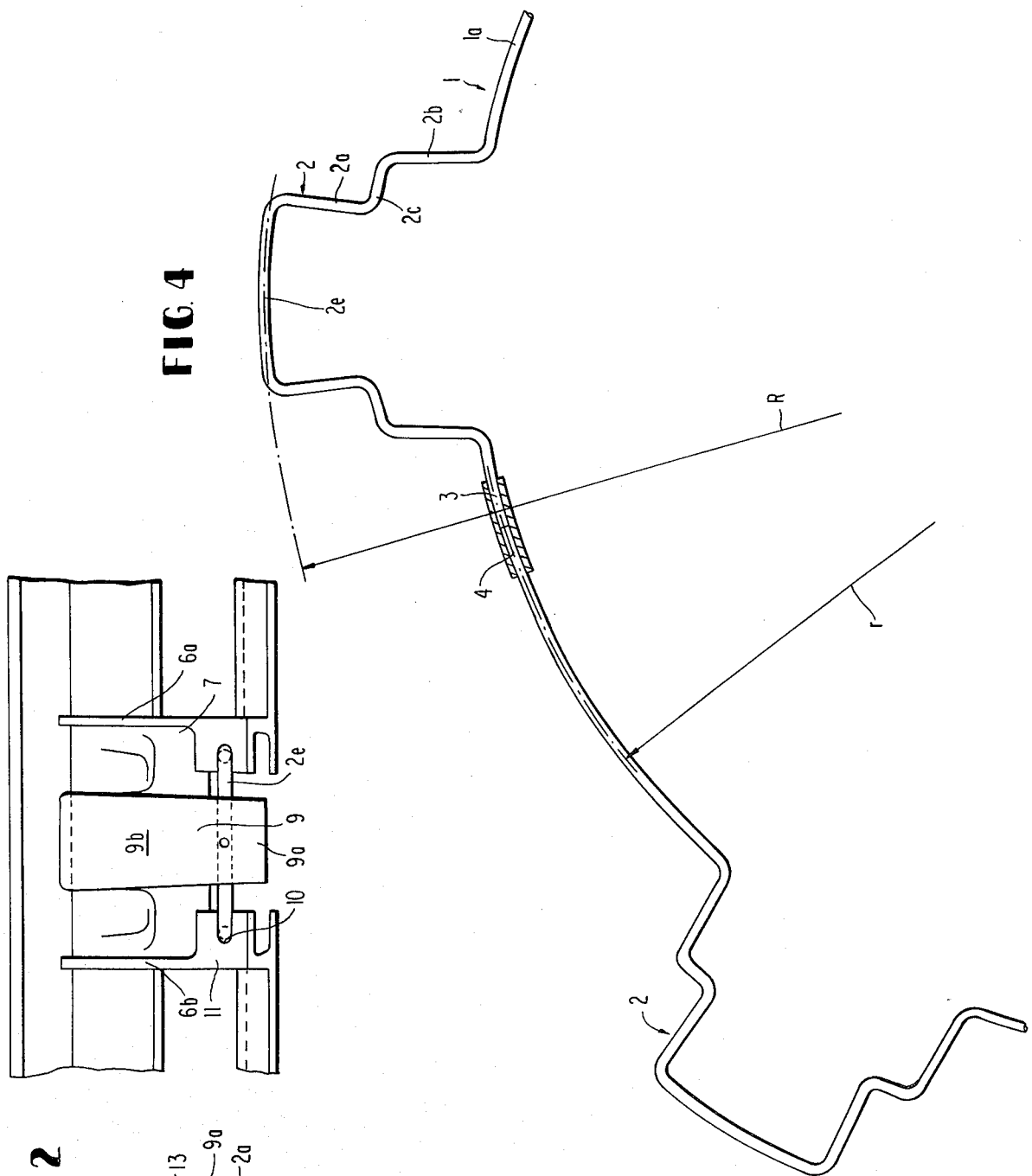
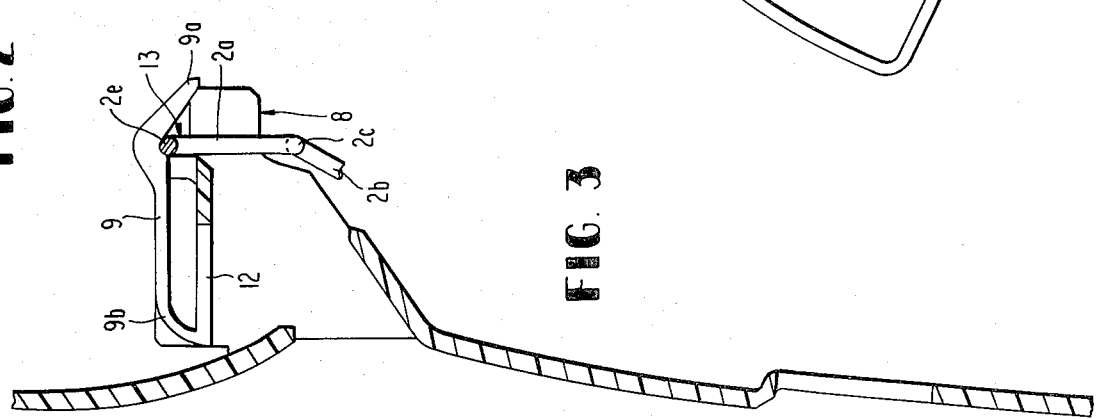

WHEEL COVER FOR A PASSENGER MOTOR VEHICLE

This is a continuation of application Ser. No. 200,384, filed Oct. 24, 1980 now abandoned.

The present invention relates to a wheel cover and, more particularly, to a wheel cover for a passenger motor vehicle, with a spring wire ring serving as mounting and securing element which includes outwardly bent lug-shaped members distributed along the circumference thereof, which for purposes of retaining the wheel cover are adapted to engage in a ring-shaped recess of the wheel rim and are retained at the wheel cover in guidances.

Wheel covers of the aforementioned type (U.S. Pat. No. 2,746,805 and Auslegeschrift 2,622,908) consist of wire rings, in which merely the lug-shaped members are constructed springy or resilient while the remaining areas of the wire rings are arranged radially fixedly at the wheel cover or they consist of radially and axially guided lug-shaped members whereby the remaining area of the wire ring is non-guided and is springy or resilient.

A disadvantage of the first mentioned prior art construction resides in the fact that the wire ring is relatively stiff since only a relatively small spring stroke or displacement is available. Consequently, the necessary forces for mounting the wheel cover on the rim of the wheel are relatively high.

A disadvantage of the second prior art construction resides in the fact that the sections lying between the lug-shaped members, themselves deflect radially toward the outside if forces act on the lug-shaped members radially inwardly of the wheel cover where they either come into abutment at parts of the wheel rim or may also be urged into areas where they are visible from the outside of the wheel cover. Consequently, the wire rings in this type of construction must be so constructed that the spring strokes or displacement traversed during deformation remain sufficiently small. However, this, in turn, leads to a relatively hard spring characteristic for such wire rings.

The present invention essentially resides in so constructing a wheel cover of the aforementioned type with a resilient wire ring that, without structural impairments, relatively large spring strokes or displacements can be reailized so that also a soft spring characteristic can be obtained for the mounting and fastening arrangement of the wheel cover.

In accordance with advantageous features of the present invention, the lug-shaped members are so arranged and extend radially outwardly so far that the connecting line of the points of force engagement between two adjacent lug-shaped members lies radially outside of the connecting sections of the wire ring which extend between the lug-shaped members.

An advantage of the aforementioned construction according to the present invention resides in the fact that, due to the moment exerted on the lug-shaped members by the effect of the force, the sections of the wire ring extending between the lug-shaped members are deformed toward the inside of the wire ring and thus also toward the inside of the wheel cover where adequate space is available. Consequently, owing to the construction according to the present invention, constructive conditions of the wheel cover itself need no longer be taken into consideration in the design of the wire rings. Consequently, the wire ring may be designed optimally for the desired mounting and retaining forces to be applied.

It has proved advantageous if six lug-shaped members distributed uniformly over the entire circumference of the spring wire ring are provided and if the lug-shaped members consist of radially outwardly extending circumferentially spaced lateral brace portions and of a transverse connecting web portion connecting the brace portions whereby each point of force engagement of the transverse connecting portion lies on a radius which is larger by about 30 to 40% than a radius along which extend the connecting sections of the wire ring. It has been found that with such a construction the wire ring obtains very soft spring characteristics so that the mounting can be accomplished in a very simple manner.

With a type of construction as proposed by the present invention it is espectially advantageous if the wire ring is inserted into the wheel cover under prestress because in this case, notwithstanding the soft spring characteristics, the spring strokes or spring displacements to be traversed during installation of the wheel cover remain small, yet an excellent seating of the wheel cover on the rim of the wheel is attained.

Accordingly, it is an object of the present invention to provide a wheel cover for a passenger motor vehicle which avoids, by simple means, the aforementioned shortcomings and disadvantages encountered in the prior art.

Another object of the present invention resides in providing a wheel cover for a passenger motor vehicle which includes a spring wire ring mounting element which compensates for certain manufacturing tolerances.

Still another object of the present invention resides in providing a wheel cover for a passenger motor vehicle, in which thermal expansion phenomena have practically no effect on the uniformity of forces produced by the mounting element of the wheel cover.

A still further object of the present invention resides in providing a wheel cover for passenger motor vehicles, for which the desired mounting and holding forces may be optimally designed.

A still further object of the present invention resides in providing a wheel cover for a passenger motor vehicle which includes a spring mounting element having a soft spring characteristic.

Still another object of the present invention resides in providing a wheel cover for passenger motor vehicles which is simple in construction and therefore relatively inexpensive to manufacture.

These and other objects, features, and advantages of the present invention will become more apparent from the following description when taken in connection with the accompanying drawings which shows, for the purposes of illustration only, several embodiments in accordance with the present invention, and wherein:

FIG. 2 is a plan view on a portion of the wheel cover on which a detent number is retained, as viewed in the direction taken along the line II–II' in FIG. 1;

FIG. 3 is a partial cross sectional view through the wheel cover of the present invention taken along the line III—III in FIG. 1, whereby the detent member and a cover extending thereover are illustrated in the operating position;

FIG. 4 is a partial view of a wire spring ring of FIG. 1 and associated by-shaped sections;

Figure 5:
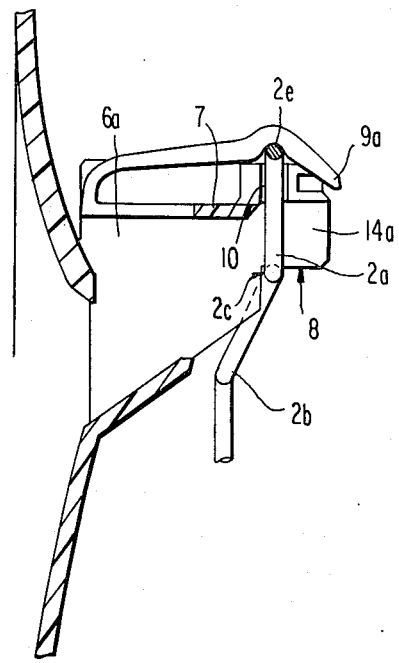
Figure 6:
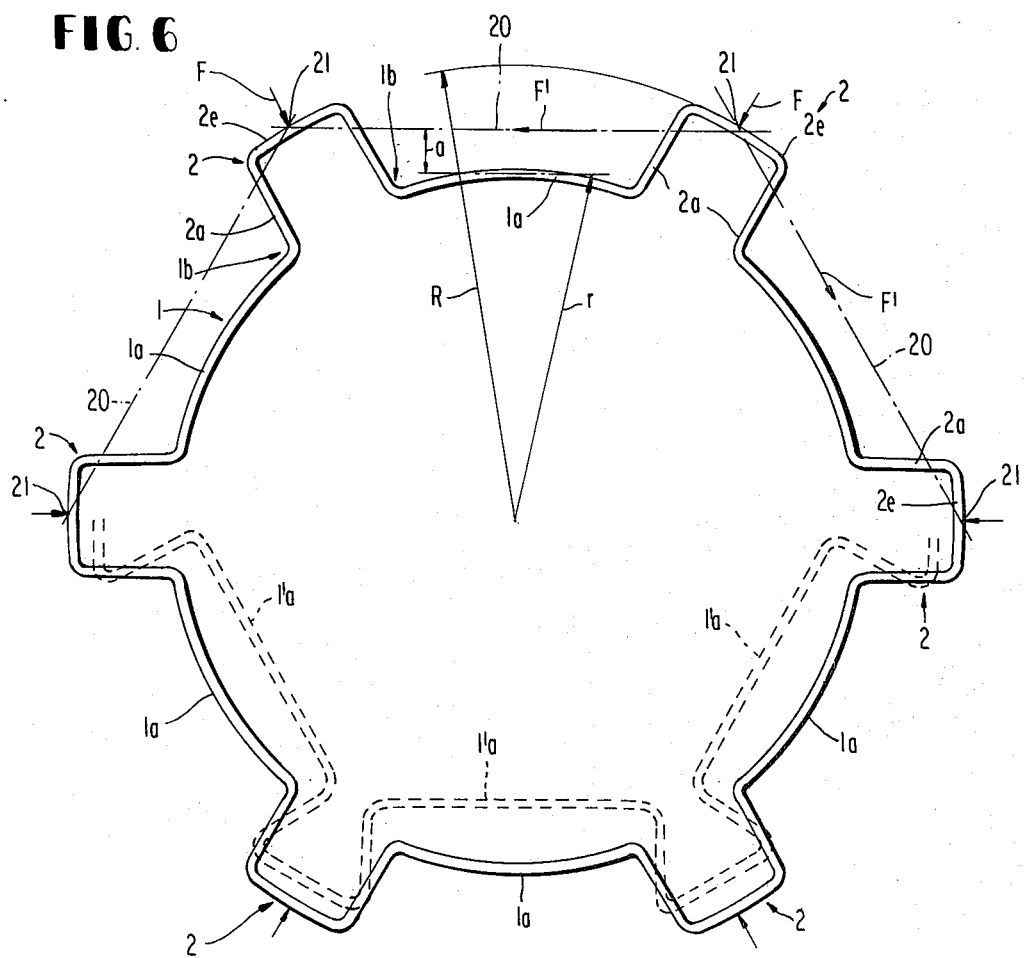

FIG. 5 is a partial cross sectional view corresponding to FIG. 3 wherein the detent member of the wire spring ring and the cover are shown in the inoperative position, i.e., after insertion into the wheel cover and before mounting of the wheel cover on a wheel rim; and FIG. 6 is a plan view of a wire spring ring for a wheel cover in accordance with a further embodiment of the present invention with a schematically indicated force characteristic in the installed condition.

Figure 1:
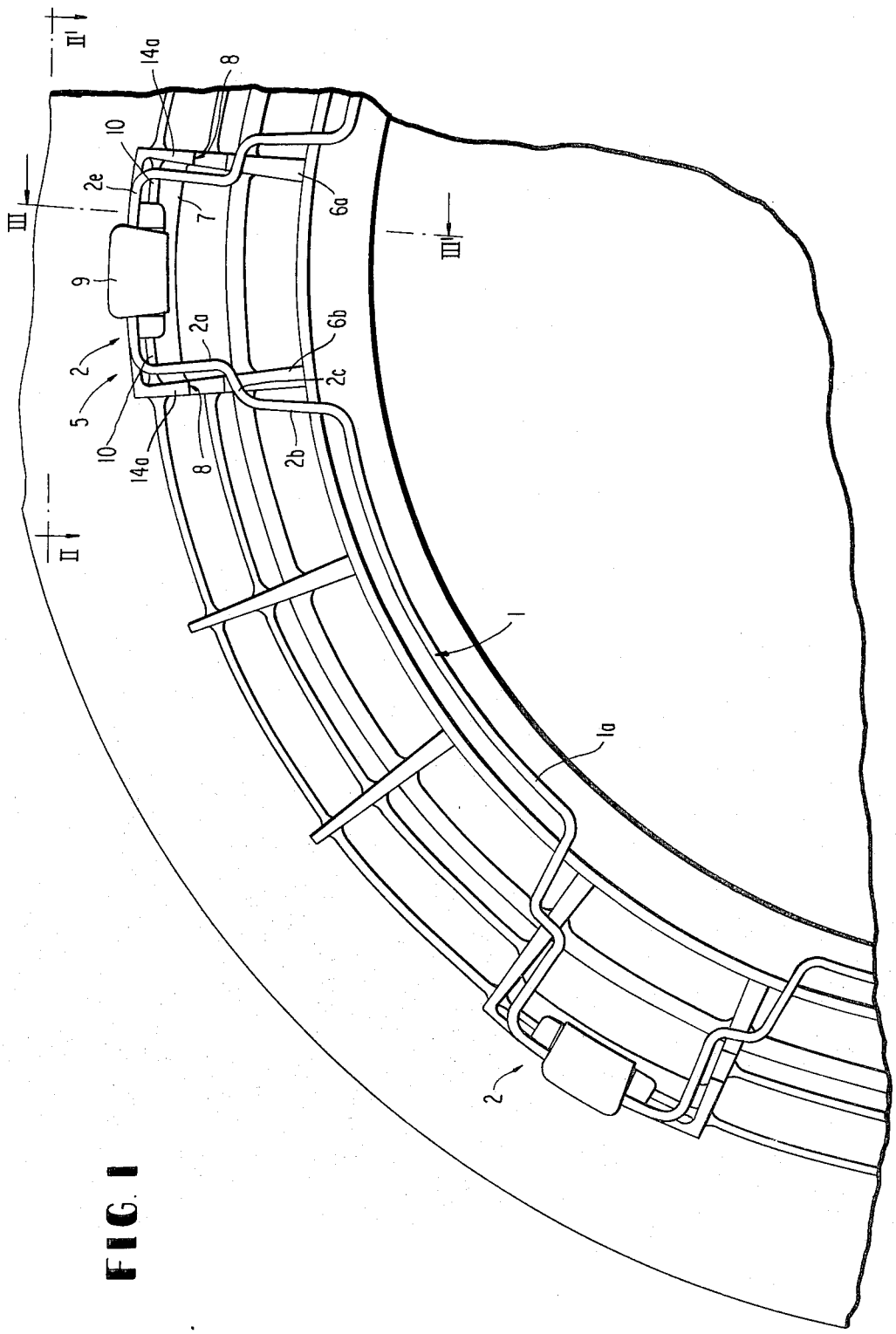
FIG. 1 is a partial rear view of a wheel cover provided with a mounting and fastening arrangement in the form of a wire spring ring in accordance with the present invention, with the wire spring ring shown in the installed condition.

Referring now to the drawing wherein like reference numerals are used throughout the various views to designate like parts, and more particularly to FIG. 1, this Figure illustrates a partial rear view of a wheel cover with a wire spring ring generally designated by reference numeral 1 which functions as a mounting and fastening element for the wheel cover. The wire spring ring 1 consists of connecting sections 1a having a circular configuration and of lug-shaped parts generally designated by reference numeral 2 which are mutually arranged at identical angles. The lug-shaped members 2 consist each of radially extending lateral brace portions 2a and 2b and of a transverse connecting web portion 2e.

As shown most clearly in FIGS. 4 and 6, the wire spring ring 1 is constructed with its circular ring-shaped connecting sections 1a and the lug-shaped members 2 as an inherently closed body. Additionally, as shown most clearly in FIG. 5, the lateral brace portions 2a and 2b of the spring wire ring 1 of FIG. 4 are bent into differing planes so that it is achieved thereby that the upper brace portions 2a of the lug-shaped member are located in a plane which is disposed approximately parallel to that plane in which are disposed the circular ring shaped sections 1a of the wire spring ring 1; the lower lateral brace portions 2b are the connecting legs of the circular ring-shaped sections 1a to the upper lateral brace portions 2a. Moreover, as shown in the plan view of the wire spring ring 1 of FIG. 4, a section 2c extending parallel to the transverse connecting web portion 2e is provided between the upper and lower lateral brace portions 2a and 2b, from which results the configuration of the wire spring ring 1 shown in FIGS. 4 and 5. The two ends of the wire spring ring 1 which are designated in FIG. 4 by reference numerals 3 and 4, are, for example, braced against each other or are welded together.

As shown more clearly in FIG. 1, the wheel cover is provided with guide means generally designated by reference numeral 5. The guide means 5 are arranged with respect to each other corresponding to the angular circumferential spacing of the lug-shaped members 2 and will be described in detail hereinafter by reference to FIGS. 2 and 3. The guide means 5 are formed essentially by walls 6a and 6b arranged in a plane perpendicular to the plane of the drawing in FIG. 1. The walls 6a and 6b are shown in side view in FIGS. 3 and 5 and are connected with each other by a web 7. The walls 6a and 6b include, as shown in FIG. 5, along their side directed toward the center of the wheel cover, a step shaped abutment generally designated by reference numeral 8 which, when the spring ring 1 is inserted into the wheel cover, is in abutment with sections 2c when the spring ring 1 assumes its position in the wheel cover corresponding to the inoperative condition. A complete function of the abutment 8 will be explained more fully hereinafter.

In the embodiment illustrated in FIG. 1, the lug-shaped member 2 is inserted into the wheel cover in such a manner that the transverse connecting portions 2c of the lug-shaped member 2 is disposed opposite the step shaped abutment 8 while the upper lateral brace portion 2a, as shown in FIG. 1, extends approximately radially toward the outside of the wheel cover so that the transverse connecting portion 2e adjoining the upper portions 2a passes underneath a cover 9 constructed tongue-shaped.

As shown in FIG. 2, the wheel cover includes recesses 10 which extend approximately radially toward the outside of the wheel cover. The recesses 10 receive the lateral brace portions 2a of the lug-shaped member 2 and, by means of sidewalls 11, form a lateral limit or stop for the lug-shaped member 2. The lateral brace portions 2a of the lug-shaped member 2 are therefore secured against displacement in the mounting sections of the wheel cover formed by the walls 6a, 6b and 11. The tongue-like covers 9 and the recesses 10 together with the step-shaped abutments 8 form the guide means 5 for the spring ring 1.

As shown in FIG. 3, the tongue-like cover member 9 has a configuration which includes a base section 12 passing over into the connecting web 7. The tongue-like cover member 9 is therefore elastically secured on the wheel cover. The tongue-like member 9 is provided with a preferably semi-circular inner groove generally designated by reference numeral 13 which is adapted to the diameter of the material of the wire spring ring 1. The inner groove 13 serves to receive the upper cross web 2e of the lug-shaped detent members 2 and is disposed in proximity to a freely movable end 9a of the tongue-like cover member 9.

The free end 9a of the tongue-like cover member 9 has an obliquely downwardly extending or beveled form—as seen in side view corresponding to FIG. 3—and is disposed on the side of the wheel cover facing the rim of a wheel (not shown). The beveling of the tongue-like members 9 in the form of the free end 9a which extends downwardly respectively toward the center axis, serves for the facilitated emplacement of the wheel cover on a mounting surface (not shown) of the wheel rim. An area 9b of the tongue-like member 9 located opposite the free end 9a, is bent and is flexible in such a way that a movement of the free end 9a with respect to the base section 12 is possible to enable an installation of the wheel cover on the wheel rim.

In the embodiment described hereinabove, the spring ring 1, shown in partial view in FIG. 4, is inserted into the wheel cover of FIG. 1 in such a manner that its lug-shaped detent parts 2 come to lie with the upper lateral brace portions 2a in the recesses 10 of the wheel cover mounting. Before the wheel cover is placed on the rim of the wheel, each lug-shaped member 2 assumes the position shown in FIG. 5 in which each part 2c of the lug-shaped members 2 come into abutment at the associated abutment 8 so that the forces of the spring prestress are absorbed by the walls 6a and 6b by way of the abutments 8 formed thereat. This means that the transverse web portions 2e of the lug-shaped members 2 do not reach such a position as would correspond to a complete relaxation or unstressing of the wire spring ring 1 but rather assume the position shown in FIG. 5, in which the free ends 9a of the tongue-like members 9 are in a raised position with respect to the front ends 14a and 14b of the walls 6a and 6b. A secure accommodation of the lug-shaped detent members 2 in the wheel cover is ensured by means of the front ends 14a and 14b since they form parts of the wheel cover and preferably integral parts of the wheel cover, which are constructed in one piece with the walls 6a and 6b, the webs 7 and the remaining surfaces of the wheel cover.

The lower lateral brace portions 2b of the lug-shaped members extend, prior to the installation of the wheel covers, at an obtuse angle with respect to the upper lateral brace portions 2a. The circular sections 1a of the spring ring 1 adjoining the lower lateral brace portions 2b lie, as shown in FIG. 5, in a plane which is approximately parallel to the plane of the upper lateral brace portions 2a. It is achieved by the aforementioned arrangement of the wire spring ring 1 in conjunction with the wheel cover that the wire spring ring 1 is under a prestress by the lug-shaped members 2 due to the cooperation of the parts 2c and the abutments 8 since the lug-shaped members 2 cannot completely expand in the radial direction. Consequently, when installing the wheel cover, only a comparatively small spring stroke or displacement of the lug-shaped members 2, especially of the transverse web portions 2e has to be overcome until the wheel cover together with the inserted wire spring ring 1 has been inserted into the associated wheel rim. Nevertheless, large retaining forces are achieved.

FIG. 3 illustrates the position of the lug-shaped member in the mounted or installed condition and makes clear the movement to be carried out by each transverse portion 2c of the lug-shaped members 2 from the position shown in FIG. 5 in order that the wheel cover can be attached to the wheel rim. Owing to the oblique configuration of the free ends 9a of the tongue-like members 9, which cause the radially inwardly directed movement of the transverse portions 2c during the mounting of the wheel cover, the attachment of the wheel cover to the wheel rim is significantly facilitated. The wire spring ring 1 therefore exerts in the installed condition a force effect of the wheel rim by way of the lug-shaped members 2 and by way of the tongue-like members 9. The wheel cover itself is therefore relieved of a permanent spring stress since the spring forces act on the wheel rim exclusively by way of the elastic tongue-like members 9.

In the installed condition, the wheel cover is therefore not stressed either by radial or axially effective forces from the wire spring ring 1 since the grooves 10 are also correspondingly constructed. In the axial direction a small play is appropriately permitted for the upper lateral brace portions 2a within the guide means 10. Since the lug-shaped members 2 are held in the tongue-like members 9, the latter assume a guiding function in the axial direction. The tongue-like members 9 may be constructed so that they counteract such axial movements as occur during operation, with an excellent vibration damping effect so that disagreeable rattling noises are thus avoided.

As shown in FIGS. 4 and 6, the wire spring rings 1 are so constructed that the transverse web portions 2e of the lug-shaped members are disposed on a radius R which is considerably larger and, preferably, larger by a factor of 1.35 than the radius r of the circular arc defined by the connecting sections 1a. As a result thereof, and by the selection of the number of the lug-shaped parts 2 and the angular spacing determined thereby between two adjacent lug-shaped members 2, it is achieved that the wire spring ring 1, when stressed by forces, is not deformed radially outwardly at any location as will be become more apparent from the description hereinbelow in connection with FIG. 6.

A soft spring characteristic is obtained with the wheel cover construction described hereinabove since the spring and/or the wire spring ring 1 is prestressed in the preassembled condition shown in FIG. 5 in the manner described hereinabove, by means of the step-shaped abutments 8. As a result thereof, in order to mount the wheel cover, only a predetermined residual spring displacement has to be overcome which assures a locking in place and a fastening of the wheel cover in the operating position and also takes into consideration certain manufacturing tolerances. Thus, the manufacturing tolerances of the wheel cover, wire spring ring, wheel rim, and thermal expansion phenomena have practically no effect on the uniformity of forces produced by the wire spring ring with respect to the wheel rim.

The embodiment described hereinabove in connection with FIGS. 1–3 and 5 may be so modified that the wheel cover is not provided with tongue-like members 9. In such a modification, the configuration of the wheel cover and the shape of the wire spring ring are identical but the guide means, serving as holding means for the wire spring ring 1, has to be so constructed that the wire spring ring 1, in the installed condition of the wheel cover on the wheel rim, holds the wheel cover in position, which is realized in the embodiment of FIGS. 1–3 and 5 by the tongue-like members 9.

According to a preferred embodiment, the depth of the recesses 10 (FIG. 2) is selected in such a manner that, in the operative position, that is, in the mounted or installed condition of the wheel (FIG. 1), the upper lateral brace portions 2a of the lug-shaped members 2 are held between the walls 11 and thereby hold the wheel cover with respect to the wheel rim. At least within the area of the lug-shaped members 2, the wire spring ring 1 is coated with a layer of synthetic resinous material forming the cover. This synthetic resinous coating prevents marring of the wheel rim by the lug-shaped detent members 2 and effects a vibration damping similar to the tongue-like members 9. However, the illustrated embodiment provided with the tongue-like members 9 is better in that regard. The mode of operation of a thus modified wheel cover is nevertheless the same as described hereinabove in connection with FIGS. 1–3 and 5.

FIG. 6 illustrates a somewhat modified embodiment of a wire spring ring generally designated by reference numeral 1' which is provided with lug-shaped members generally designated by reference numerals 2'. The lug-shaped members 2' differ from the lug-shaped members 2 in that the lug-shaped members 2' are provided only with two lateral brace portions 2a and a transverse connecting web portion 2e whereas the section 2c, provided in the embodiment of FIGS. 1 and 4, has been omitted. As to the rest, the wire spring ring 1' of FIG. 6 is inserted into the wheel cover in the same manner as described hereinabove in connection with FIGS. 1–5. The wire spring ring 1' can likewise be held under prestress in that the two end sections 1b of the connecting sections 1a which are disposed between the lug-shaped members 2', come into abutment at corresponding parts provided on the wheel cover. However, the wire spring ring 1' of FIG. 6 can also be inserted into other wheel covers where it is not under a prestress.

The governing feature in the spring wire ring 1' of FIG. 6, as is also the case in the spring wire ring 1 of FIGS. 1 and 4, is that the transverse web portions 2e of each lug-shaped member 2 or 2' are arranged on a radius R which is markedly larger than a radius r, on which are disposed the circular arc-shaped connecting sections between individual lug-shaped members 2 or 2'. In the illustrated embodiments, the radius R is larger by approximately a factor of 1.35 than the radius r and, advantageously, six lug-shaped members 2 or 2' are distributed uniformly over the circumference of the spring wire ring 1 or 1' so that an angular spacing of 60° results between two lug-shaped members 2 or 2'. With the selected radial length of the lateral brace portions 2a or 2'a, the connecting line 20 between points of force application 21 of two adjacent lug-shaped members 2 or 2', thus extends radially outwardly of the connecting sections 1a in the illustrated embodiment by a distance a radially outwardly of the center of the circular arc-shaped connecting sections 1a.

In FIG. 6, the reference character F denotes the clamping forces exerted, after the installation, on the wire ring 1' by the clamping locations of the wheel rim, which clamping forces F engage directed radially inwardly at each individual lug-shaped member 2'. If the force F is decomposed into two partial forces F' corresponding to the transverse web portions 2'e extending approximately tangentially to the circle having a radius R, then it follows that a moment of the magnitude Fxa acts from each lug-shaped member 2 on the connecting section 1a between two respective lug-shaped members 2', which necessarily deforms the wire ring 1' radially inwardly as indicated in dash lines in the lower half of FIG. 6. As can be seen from FIG. 6, the connecting sections 1a are thereby urged into the positions 1'a. Since the wire ring 1' in accordance with the present invention can be deformed only inwardly where there is sufficient spaces within the wheel cover, the wire spring ring 1' itself can be designed without giving any consideration to the space conditions in the wheel cover. This means that the wire spring ring can be optimally matched to the dimensions provided for fastening within the wheel rim, and that very soft spring characteristics can thus be realized because a large spring displacement can be made available for the wire spring ring 1'. By virtue of the novel construction according to the present invention, it is thus possible to fully utilize the entire used spring material of the wire spring 1 or 1'.

These advantageous properties can be utilized, as can be readily appeciated, for wire spring rings 1 which, as shown in FIGS. 1–5, are seated in the wheel cover under prestress; however, these properties can also be utilized in wheel covers where such prestress is dispensed with. If, however, a spring wire ring 1' according to FIG. 6 or a spring wire ring 1 according to FIG. 1 and 4 is inserted under prestress, then the above-described advantages of a very small spring displacement are achieved which must be traversed during the installation without any impairment of the holding forces.

While I have shown and described several embodiments in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A wheel cover for a passenger motor vehicle, the wheel cover including a wire spring ring means for enabling a mounting of the wheel cover to a rim of the wheel, the wire spring ring means including a plurality of circumferentially spaced outwardly extending lug-shaped members adapted to engage in a recess of the rim of the wheel, and connecting sections respectively disposed between adjacent lug-shaped members for connecting the lug-shaped members with each other, characterized in that the lug-shaped members are disposed relative to the connecting sections so as to extend radially outwardly to a position such that a connecting line extending between the points of force application of each two adjacent lug-shaped members lies radially outside of the connecting sections between the lug-shaped members, a predetermined number of lug-shaped members being provided distributed uniformly about the circumference of the wire spring ring means, each of the lug-shaped members including a pair of circumferentially spaced lateral brace portions extending radially outwardly and a cross web means for connecting the respective pairs of lateral brace portions, the points of force application being effective on the cross web means, and in that each force application point lies on a radius which is larger than the radius on which the connecting sections of the wire spring ring means lie, and means including parts of said brace portions for prestressing said wire spring ring means prior to and during mounting of the wire spring ring means on the wheel cover.

2. A wheel cover according to claim 1, characterized in that each lug-shaped member includes a pair of circumferentially spaced lower brace portions, a pair of circumferentially spaced upper brace portions, means cooperating with the wheel cover and for connecting the upper and lower brace portions to each other, and a cross web means for connecting the upper brace portions together, and in that adjacent upper and lower brace portions are disposed in separate intersecting planes to provide prestressing prior to and during mounting of the wire spring ring means on the wheel cover.

3. A wheel cover for a wheel of a motor vehicle, with a springy wire ring means serving as fastening means and including a plurality of circumferentially spaced outwardly extending lug-shaped members and connecting sections disposed between adjacent lug-shaped members for connecting the lug-shaped members with each other, said lug-shaped members being operable to engage in an annular recess of a wheel rim and being retained in guide means for mounting the wheel cover in the wheel rim, characterized in that the lug-shaped members are so arranged and extend radially outwardly so far that the connecting line of the points of force engagement between each two adjacent lug-shaped members lies radially outside of the connecting sections of the wire ring means extending between the lug-shaped members, and in that the connecting sections are freely movable in the generally radial direction relative to the wheel cover and are substantially devoid of any contact therewith to prevent direct transmission of any forces between said connecting sections and the wheel cover.

4. A wheel cover according to claim 3, characterized in that the wire ring means includes a number of lug-shaped members distributed uniformly about the circumference thereof.

5. A wheel cover according to claim 4, wherein said number is greater than four.

6. A wheel cover according to claim 5, wherein said number is six.

7. A wheel cover according to claim 3, characterized in that each of the lug-shaped members includes radially outwardly extending lateral brace portions and transverse web means connecting respective lateral brace portions and in that each point of force engagement of the transverse web means lies on a radius which is larger than the radius, on which lie the connecting sections of the wire ring means which interconnect the lug-shaped members.

8. A wheel cover according to claim 7, characterized in that the radius of each point of force engagement is about 30–40% larger than the radius, on which lie the connecting sections.

9. A wheel cover according to claim 3, characterized in that each of the lug-shaped members includes radially outwardly extending lateral brace portions and transverse web means connecting respective lateral brace portions and in that each point of force engagement of the transverse web means lies on a radius which is larger than the radius, on which lie the connecting sections of the wire ring means with interconnect the lug-shaped members.

10. A wheel cover according to claim 9, characterized in that the radius of each point of force engagement is about 30–40% larger than the radius, on which lie the connecting sections.

11. A wheel cover according to claim 10, characterized in that the wire ring means includes a number of lug-shaped members distributed uniformly about the circumference thereof.

12. A wheel cover according to claim 11, wherein said number is greater than four.

13. A wheel cover according to claim 3, characterized in that each lug-shaped member includes a pair of circumferentially spaced lower brace portions, a pair of circumferentially spaced upper brace portions, means for connecting the upper and lower brace portions with each other, and a transverse web means interconnecting the upper brace portions.

14. A wheel cover according to claim 13, characterized in that the upper brace portions are disposed in a plane approximately parallel to a plane in which the connecting sections are disposed, and in that the means for connecting the upper and lower brace portions are disposed approximately parallel to the transverse web means.

15. A wheel cover according to claim 14, characterized in that the guide means on the wheel cover for guiding the lug-shaped members includes means for limiting lateral movement of the lug-shaped members and cover means for covering the transverse web means of a respective lug-shaped member.

16. A wheel cover according to claim 15, characterized in that said limiting means includes a pair of circumferentially spaced side walls provided with recess means for accommodating respective upper brace portions.

17. A wheel cover according to claim 16, characterized in that the cover means is formed as a tongue-like member elastically mounted on the wheel cover and adapted to extend over the transverse web means, the tongue-like member being provided with an inner groove for accommodating the transverse web means, and in that the guide means further includes abutment means operable to engage with the means connecting the upper and lower brace portions for prestressing the wire means upon abutment of said connecting means with said abutment means.

18. A wheel cover according to claim 17, characterized in that the tongue-like member terminates in an oblique free end portion for causing an inwardly oriented movement of the transverse web means during mounting of the wheel cover on the rim of a wheel.

19. A wheel cover according to claim 3, characterized in that the lug-shaped members each include a pair of circumferentially spaced brace portions and a transverse web-like connecting portion connecting the brace portions, and in that the web portions are disposed on a radius which is about 1.35 times larger than the radius of the connecting sections.

20. A wheel cover for a wheel with a wheel rim according to claim 3, in which retaining forces are exerted by said wire ring means onto the wheel rim exclusively within the radially outermost area of the lug-shaped members while the wheel cover itself is relieved of any permanent spring stress.

21. A wheel cover according to claim 20, further comprising a number of tongue-like cover members resiliently connected to said wheel cover and operable to transmit the retaining forces from the lug-shaped members to the wheel rim, by engagement of the cover members on one side thereof with the radially outermost area of the lug-shaped members for engagement with the rim on the opposite side thereof.

22. A wheel cover according to claim 3, further comprising means in the wheel cover cooperating with said lug-shaped members for prestressing the wire ring means when installed on the wheel cover prior to installation thereof on the wheel.

23. A wheel cover according to claim 22, wherein said further means includes abutment means on the wheel cover which are so arranged that the lug-shaped members abut thereagainst to produce the prestress, when the wire ring means is installed on the wheel cover prior to installation thereof on the wheel, and lift off from said abutment means as the lug-shaped members are forced radially inwardly during engagement with the wheel rim.

24. A wheel cover for a wheel with a wheel rim according to claim 22, in which retaining forces are exerted by said wire ring means onto the wheel rim exclusively within the radially outermost area of the lug-shaped members while the wheel cover itself is relieved of any permanent spring stress.

25. A wheel covering according to claim 24, further comprising a number of tongue-like cover members resiliently connected to said wheel cover and operable to transmit the retaining forces from the lug-shaped members to the wheel rim, by engagement of the cover members on one side thereof with the radially outermost area of the lug-shaped members for engagement with the rim on the opposite side thereof.

26. A wheel cover according to claim 25, wherein said further means includes abutment means on the wheel cover which are so arranged that the lug-shaped members abut thereagainst to produce the prestress, when the wire ring means is installed on the wheel cover prior to installation thereof on the wheel, and lift off from said abutment means as the lug-shaped members are forced radially inwardly during engagement with the wheel rim.

27. A wheel cover according to claim 26, characterized in that each lug-shaped member includes a pair of circumferentially spaced lower brace portions, a pair of circumferentially spaced upper brace portions, means for connecting the upper and lower brace portions with each other in such a manner that the upper brace portions are disposed in a plane at least approximately parallel to the plane containing the connecting sections but axially spaced away from the cover, and a transverse web means interconnecting the upper brace portions.

28. A wheel cover according to claim 22, characterized in that each lug-shaped member includes a pair of circumferentially spaced lower brace portions, a pair of circumferentially spaced upper brace portions, means for connecting the upper and lower brace portions with each other in such a manner that the upper brace portions are disposed in a plane at least approximately parallel to the plane containing the connecting sections but axially spaced away from the cover, and a transverse web means interconnecting the upper brace portions.

29. A wheel cover for a wheel of a motor vehicle, with a springy wire ring means serving as fastening means and including a plurality of circumferentially spaced outwardly extending lug-shaped members and connecting sections disposed between adjacent lug-shaped members for connecting the lug-shaped members with each other, said lug-shaped members being operable to engage in an annular recess of a wheel rim and being retained in guide means for mounting the wheel cover in the wheel rim, and further means in said wheel cover operable to prestress the wire means on the wheel cover prior to installation on the wheel and thereby enable a relatively soft spring characteristic for said wire ring means with relatively small spring displacements during assemby of the wheel cover onto the wheel rim by inward spring deflections of the lug-shaped members during such assembly including further means assuring a location of the points of force engagement with the radially outer areas of the lug-shaped members in such a manner that a line connecting the points of force engagement between each adjacent lug-shaped members lies radially outside of the connecting section connecting said adjacent lug-shaped members, the connecting sections being freely movable in the generally radial direction relative to the wheel covering and being substantially devoid of any contact therewith to prevent any direct transmission of retaining forces between said connecting sections and the wheel cover.

30. A wheel cover according to claim 29, wherein said means in said wheel cover includes abutment means operable to engage with parts of the lug-shaped members for preliminarily stressing the wire ring means in the condition in which the wire ring means is installed on the wheel cover in the position of the wheel cover ready for assembly onto a wheel rim, said parts of the lug-shaped members being disengaged from said abutment means upon application of forces on said outer areas from the wheel rim during such assembly.

* * * * *